United States Patent
Dowty et al.

(10) Patent No.: US 11,834,184 B2
(45) Date of Patent: Dec. 5, 2023

(54) ACTIVE NIJ REDUCTION DEVICES

(71) Applicant: B/E Aerospace, Inc., Winston-Salem, NC (US)

(72) Inventors: Mark B Dowty, Rural Hall, NC (US); Jonathon Jarvis, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/711,778

(22) Filed: Apr. 1, 2022

(65) Prior Publication Data
US 2023/0312102 A1  Oct. 5, 2023

(51) Int. Cl.
*B64D 11/06* (2006.01)

(52) U.S. Cl.
CPC .................. *B64D 11/0638* (2014.12)

(58) Field of Classification Search
CPC ....... A47C 7/70; B60N 3/004; B64D 11/0638
USPC .................... 297/146, 216.1, 217.2
See application file for complete search history.

(56) References Cited

U.S. PATENT DOCUMENTS

| | | | |
|---|---|---|---|
| 6,550,861 B1 | 4/2003 | Williamson | |
| 9,475,447 B1 | 10/2016 | Whitens et al. | |
| 10,556,688 B2 | 2/2020 | Bhat et al. | |
| 10,710,486 B2 | 7/2020 | Newbold | |
| 11,091,071 B2 | 8/2021 | Marais et al. | |
| 11,186,372 B2 * | 11/2021 | Drenzeck | B64D 11/0638 |
| 2013/0341975 A1 | 12/2013 | Schneider et al. | |
| 2015/0158589 A1 * | 6/2015 | Meckes | B64D 11/0638 29/559 |
| 2016/0039349 A1 * | 2/2016 | Casagrande | G06F 1/166 156/227 |
| 2016/0101710 A1 * | 4/2016 | Bonk | B60N 2/0252 297/217.2 |
| 2016/0129879 A1 * | 5/2016 | Harda | B60N 2/42727 297/216.13 |
| 2019/0005610 A1 * | 1/2019 | Tillotson | G06T 3/20 |
| 2019/0283881 A1 * | 9/2019 | Colletti | B64D 11/0638 |
| 2020/0148081 A1 | 5/2020 | Marais et al. | |
| 2021/0122473 A1 * | 4/2021 | Germe | B64D 11/0621 |

(Continued)

FOREIGN PATENT DOCUMENTS

| | | |
|---|---|---|
| GB | 2582768 B | 8/2021 |
| WO | 2017095477 A1 | 6/2017 |

OTHER PUBLICATIONS

Taylor et al., "Effect of Passenger Position on Crash Injury Risk in Transport-Category Aircraft", Civil Aerospace Medical InstituteFederal Aviation Administration Oklahoma City, OK 73125, Published Date : Sep. 1, 2015, Report No. DOT/FAA/AM-15/17.

(Continued)

*Primary Examiner* — Jose V Chen
(74) *Attorney, Agent, or Firm* — Suiter Swantz pc llo

(57) ABSTRACT

A passenger seat is described which reduces neck deflection in a 16G loading event. The passenger seat includes one or more seatback surfaces which translate to shield a surface, such as a latch mechanism, during the crash event. By shielding the latch mechanism, a smooth surface is created, thereby reducing a likelihood of a passenger's head becoming trapped on the latch mechanism. The seatback surfaces actuated include one or more of a shroud surrounding the latch mechanism, a pocket defined by the shroud, or a hinged surface.

13 Claims, 12 Drawing Sheets

(56) References Cited

U.S. PATENT DOCUMENTS

2022/0314796 A1* 10/2022 Kawahara .............. B60K 35/00
2022/0382135 A1* 12/2022 McIntosh ............. G03B 21/142
2023/0037645 A1* 2/2023 Fei ......................... B60N 3/004

OTHER PUBLICATIONS

Extended European Search Report dated Sep. 4, 2023; European Application No. 23164564.9.

* cited by examiner

100

ACTIVE NIJ REDUCTION DEVICES

TECHNICAL FIELD

The present invention generally relates to passenger seating, and more specifically to tray table designs to reduce neck flexion.

BACKGROUND

A neck injury criterion (NIJ) may require devices or designs to reduce excessive deflection of the neck during a 16 g dynamic test. Typically, seatbacks may be designed to reinforce problematic areas. By reinforcing problematic areas, a likelihood of the areas being crushed during impact with a passenger's head may be reduced, similarly reducing a likelihood of neck injury. The seating arrangement may also be designed such that a pitch between the seats is such that the passenger's head is unlikely to strike the problematic areas during impact.

SUMMARY

A passenger seat is disclosed, in accordance with one or more embodiments of the present disclosure. In one illustrative embodiment, the passenger seat includes a seatback with a rearward facing surface. In another illustrative embodiment, the passenger seat includes an accelerometer configured to generate a signal in response to detecting an acceleration indicative of an emergency event. In another embodiment, the passenger seat includes an actuator configured to translate one or more surfaces connected to the rearward facing surface in response to the actuator receiving the signal from the accelerometer. In another illustrative embodiment, the one or more surfaces connected to the rearward facing surface are translated to reduce a neck injury associated with neck flexion of a passenger sitting behind the passenger seat when striking the passenger seat.

A passenger seat is disclosed, in accordance with one or more embodiments of the present disclosure. In one illustrative embodiment, the passenger seat includes a seatback. In another illustrative embodiment, the passenger seat includes an accelerometer configured to generate a signal in response to detecting an acceleration indicative of an emergency event. In another illustrative embodiment, the passenger seat includes a tray table. In another illustrative embodiment, the passenger seat includes a molding disposed on a rear surface of the seatback. In another illustrative embodiment, the passenger seat includes an actuator configured to translate one or more portions of the tray table or the molding latch mechanism in response to receiving the signal from the accelerometer. In another illustrative embodiment, the one or more portions of the tray table or the molding are translated to reduce a neck injury associated with striking the passenger seat.

A system for protecting a neck of a passenger is described, in accordance with one or more embodiments of the present disclosure. In one illustrative embodiment, the system includes a seatback. In another illustrative embodiment, the system includes a tray table. In another illustrative embodiment, the system includes a latch mechanism configured to rotate to a downward position for securing the tray table in a stowage position. In another illustrative embodiment, the system includes a molding disposed on a rear surface of a seatback. In another illustrative embodiment, the molding includes a shroud defining a pocket. In another illustrative embodiment, at least a portion of a latch mechanism is disposed in the pocket. In another illustrative embodiment, the system includes an actuator configured to translate the pocket relative to the shroud to shield the latch mechanism in response to the actuator receiving a signal indicative of an emergency event. In another illustrative embodiment, the pocket and the latch mechanism each include an exterior surface which are flush when the pocket is translated to shield the latch mechanism.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
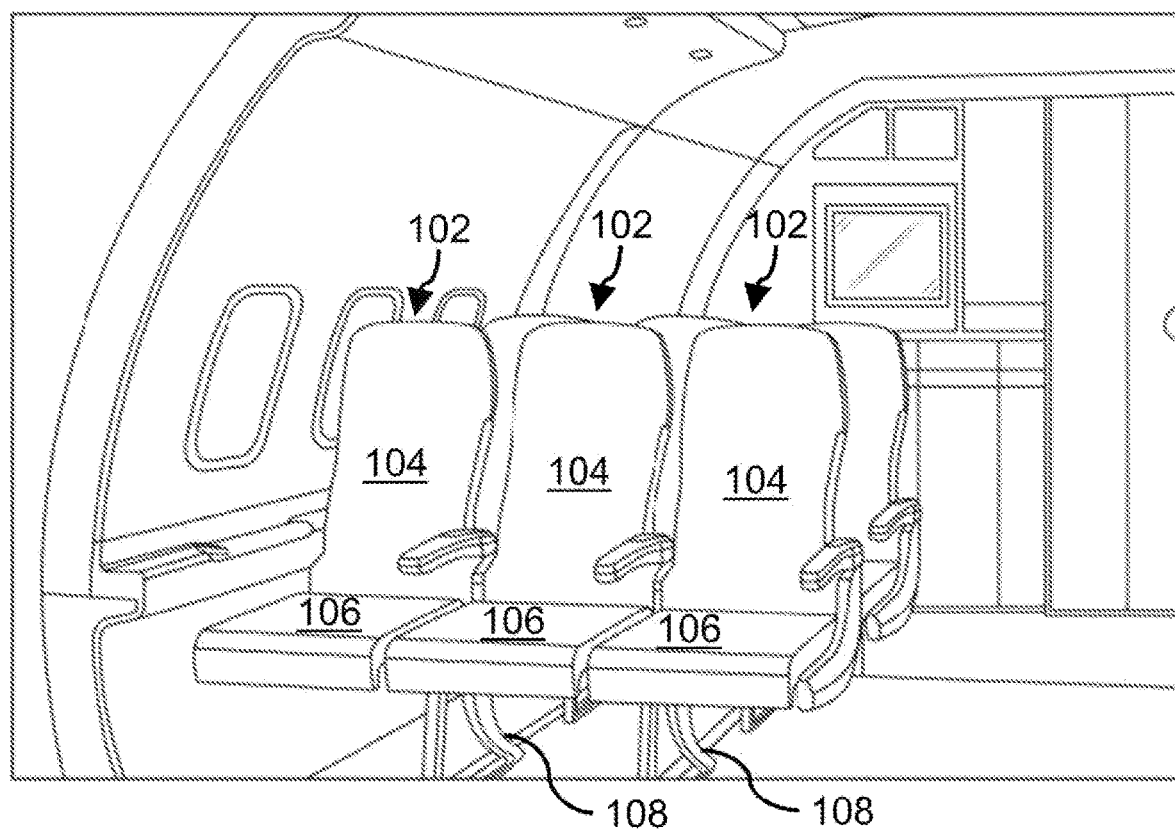
FIG. 1A depicts a perspective view of an aircraft including passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Described herein are a series of components of a passenger seat for reducing neck flexion and thereby satisfy a neck injury criterion (NiJ). The components are actively actuated to reduce a neck injury associated with striking the passenger seat for a passenger sitting behind the seat. In this regard, one or more portions of a tray table or a molding are translated to reduce the neck injury criterion. In particular, the portions of the tray table or the molding may be translated to smoothen out the surface, such that bumps or protrusions on the seatback may cause minimal longitudinal motion or vibration as the head moves down the seatback during an impact event. For example, the protrusions may include a latch mechanism which may be shielded by the tray table or the molding. Shielding the tray table latch may include creating a smooth surface over which the head travels for reducing the neck injuries. The smooth surface may reduce a likelihood a passenger's head is caught in the table latch and rotated backwards. The components described may also provide additional benefits, such as, but not limited to, reduction of unintentional meal tray deployment. The components may actively shield the tray table latch mechanism in response to a signal indicative of an emergency event. Acceleration indicative of an emergency event, such as a crash event or a turbulence event, may be detected by an accelerometer. One or more surfaces of the passenger seat may then be moved in response to detecting the acceleration to create a smooth surface for the latch mechanism. The smooth surface may thus reduce a likelihood of the passenger's head becoming trapped on the latch mechanism during impact.

Figure 1B:
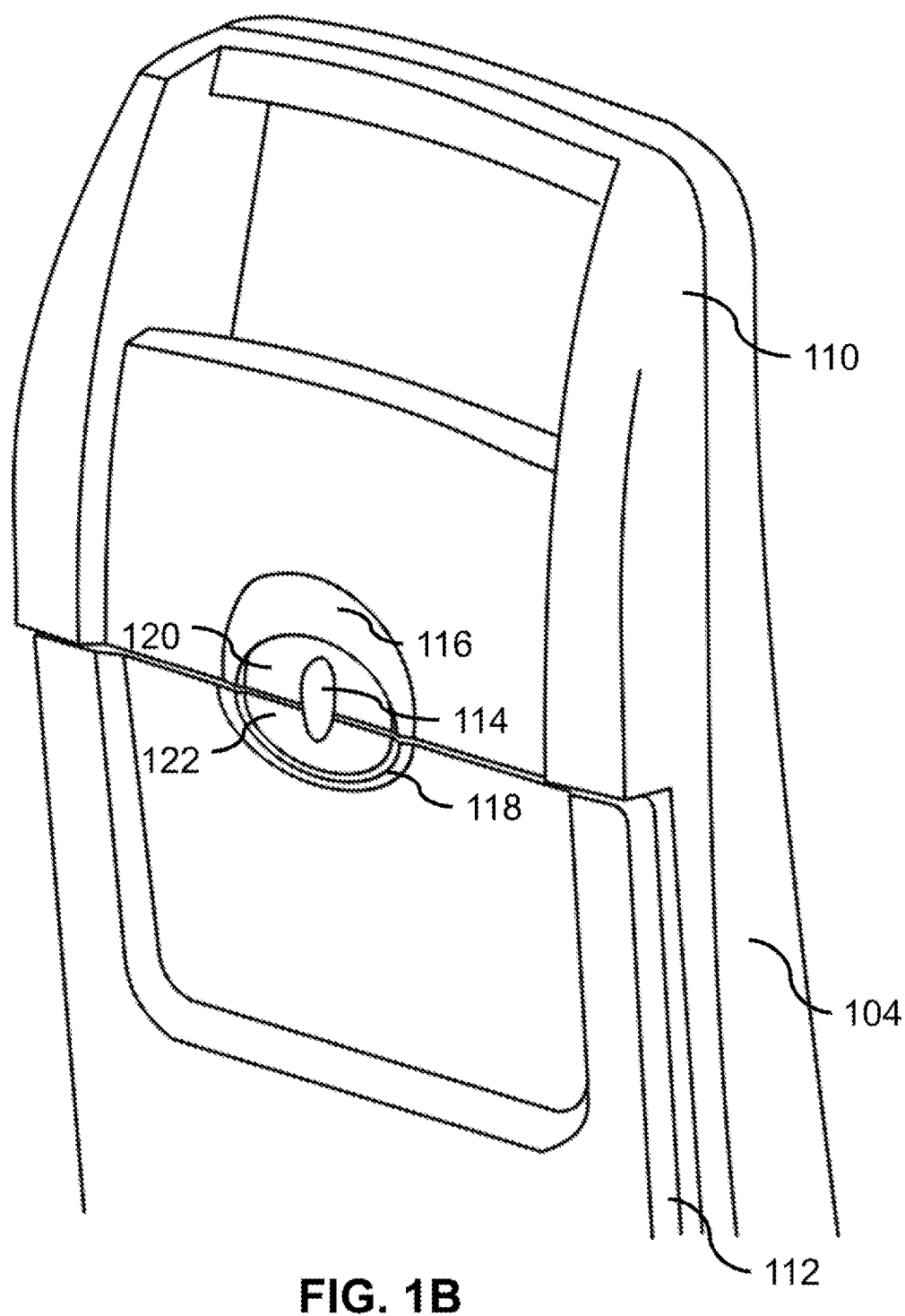
FIG. 1B depicts a rear view of a passenger seat, in accordance with one or more embodiments of the present disclosure.

Referring now to FIGS. 1A-1B, an example embodiment of an aircraft 100 that includes a plurality of passenger seats 102 is described, in accordance with one or more embodiments of the present disclosure. Each passenger seat 102 includes a seatback 104 and a seat pan 106. The passenger seat 102 also includes a leg 108 (also referred to as a seat support structure, a seat chassis, and the like) that is coupled to a floor (e.g., by a track) for providing structural support to the seat pan 106 and the seatback 104. In embodiments, the seatback 104 and the seat pan 106 may be separate structures and/or may include one or more shared components. For example, the seatback 104 and the seat pan 106 can have a shared cushion or covering. The seatback 104 may also be configured to move relative to the seat pan 106. For example, the seatback 104 can be configured to transition between upright and reclining positions. In embodiments, the seat pan 106 can also be actuated such that the passenger seat 102 may be configurable between an upright position and a bed position, although this is not intended to be a limitation of the present disclosure.

As shown in FIG. 1B, the seatback 104 may include a rearward facing surface with one or more additional surfaces coupled to the rearward facing surface, such as, but not limited to, a molding 110, a tray table 112, and a latch mechanism 114. In embodiments, one or more surfaces of the molding 110 or the tray table 112 may be actively translated to reduce a neck injury associated with striking a bump, ridge, gap, ledge or other surface disposed on the seatback 104, such as, to shield the latch mechanism 114. By shielding the latch mechanism 114, a smooth surface may be formed. As used herein, the term shield may include completely or at least partially filling in a component of the seatback, and may also refer to completely or at least partially covering the component. The smooth surface may reduce a likelihood of the passenger's chin getting caught on the latch mechanism 114, thereby resulting in a neck injury. The smoothed surface may also act to restrain the tray table 112 in a stowage position and reduce an ability of the head striking the tray table 112 from snagging the top surface of the tray table 112, although this is not intended to be limiting. The molding 110 and the tray table 112 may be fabricated from any material known in the art including, but not limited to, plastics, metals, and the like.

The latch mechanism 114 may be provided for securing the tray table 112 in a stowage position (also referred to herein as a closed position). The latch mechanism 114 may be actuated in order to lock the tray table 112 in the stowage position, and release the tray table 112 into an "open" or horizontal position.

The molding 110 may include a shroud 116. The shroud 116 may be integrally formed with the molding 110 or may be separable from the molding 110. The shroud 116 may define a pocket 120. In embodiments, the latch mechanism 114 is disposed in the pocket 120. The shroud 116 may include a contoured surface with a given curvature. The shroud 116 may thus be provided to protect the latch mechanism 114 from inadvertently disengaging due to downward swiping motions.

The tray table 112 may include also include a shroud 118. The shroud 118 may be integrally formed with the tray table 112 or may be separable from the molding 110. The shroud 118 may define a pocket 122. The latch mechanism 114 may be rotated to extend in a downward position in which the latch mechanism 114 interferes with the pocket 122, thereby locking the tray table 112 in the stowage position. The shroud 118 may also include a clearance with the latch mechanism 114, such that the latch mechanism 114 may be rotated to a horizontal position in which the latch mechanism 114 does not interfere with the pocket 122, thereby unlocking the tray table 112. The shroud 118 may include a contoured surface with a given curvature. The shroud 118 may thus be provided to protect the latch mechanism 114 from inadvertently disengaging due to upward swiping motions.

One or more of the latch mechanism 114, the pocket 120, or the pocket 120 may provide a risk of neck injury due to flexure upon impact with the latch mechanism 114, the pocket 120, or the pocket 120. To address the possibility of neck injury, one or more components of the seatback 104 may be selectively actuated to shield the latch mechanism 114. For example, one or more of the shroud 116, the shroud 118, the pocket 120, the pocket 122, or a hinged surface 602 may be actuated to shield the latch mechanism 114. The shroud 116, the shroud 118, the pocket 120, the pocket 122, or the hinged surface 602 may shield the latch mechanism 114 in any number of manners, such as by at least partially fill in a pocket in which the latch mechanism is disposed, at least partially cover the latch mechanism, and the like. The various components described may be actuated in an emergency event to reduce a likelihood of NiJ for a passenger sitting behind the passenger seat 102 while minimally impacting the livable space. As depicted, the passenger seat 102 is provided in a pre-crash state in which the latch mechanism 114 is unshielded by an active component. After a signal indicative of an emergency event (e.g., a crash) has been sensed and received, the latch mechanism 114 may be shielded by one or more of the shroud 116, the shroud 118, the pocket 120, the pocket 122, or the hinged surface 602. By shielding the latch mechanism 114, the latch mechanism 114 may also protected from inadvertent activation causing an unintended deployment of the tray table 112, which may also cause injuries during an emergency event and/or prevent egress.

Figure 2:
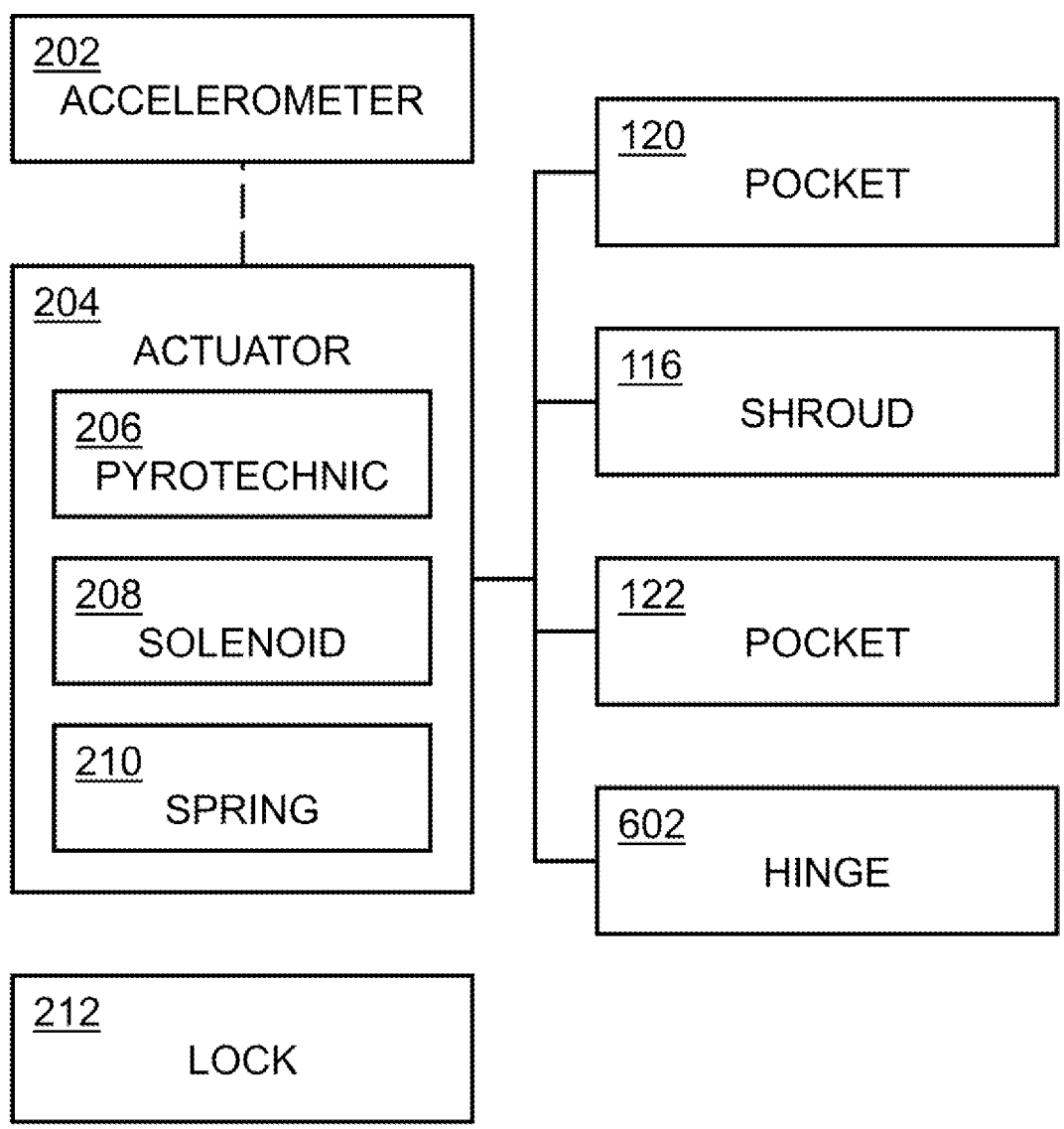
FIG. 2 depicts a simplified control diagram of a passenger seat, in accordance with one or more embodiments of the present disclosure.

FIG. 2 depicts a simplified schematic diagram of one or more components of a HIC system for the aircraft passenger seat 102, in accordance with one or more embodiments of the present disclosure. For example, the passenger seat 102 may include an accelerometer 202 and an actuator 204. The actuator 204 may be provided for translating one or more components of the seatback thereby shielding a surface connected to the rearward facing surface of the seatback which is likely to cause neck flexion in the event of striking the passenger seat, such as, but not limited to, the latch mechanism 114, a cupholder 702, a video monitor 704, a coat hook 706, a top edge 708 of the tray table 112, a pivot bar 710, and the like built-in tray table or molding accessories. By the actuator 204, the passenger seat 102 may meet a neck-injury criterion while minimally increasing a thickness of the molding 110 and the tray table 112. The actuator 204 may thus be considered one or more components of a system which actively mitigates injuries by shielding the latch mechanism 114.

The actuator 204 may be engaged in response to receiving a signal from the accelerometer 202. The accelerometer 202 may be configured to detect one or more accelerations indicative of an emergency event and provide the signal to the actuator 204. The accelerations detected by the accelerometer 202 may correspond to a crash event, a turbulence event, or the like. The accelerometer 202 may also be configured to generate a signal in response to detecting the accelerations. For example, the accelerometer 202 may include one or more trigger conditions. Upon satisfaction of the trigger conditions the accelerometer 202 may generate the signal. The trigger conditions may generally include any suitable range of (de)acceleration, such as, but not limited to, detecting 16G of acceleration. Furthermore, the trigger conditions may be based on the direction of the acceleration.

In some instances, the actuator 204 may translate an associated component of the seatback within 200 milliseconds of receiving a trigger signal from the accelerometer 202. By performing actuation within the 200-millisecond timeframe, the components may be motivated to the desired position prior to head impact. For example, the actuator 204 may translate one or more rear components of the seatback, such as, but not limited to, the shroud 116, the shroud 118, the pocket 120, the pocket 122, or the hinged surface 602 within the 200-millisecond timeframe.

The accelerometer 202 may be electrically coupled to one or more components of the passenger seat 102, such as, but not limited to, the actuator 204. For example, the accelerometer 202 may be electrically coupled to a wiring harness, or the like, which may be routed through the passenger seat 102 to the actuator 204. In some instances, the wiring harness may also provide electrical power to the actuator 204. For example, the wiring harness may provide aircraft line power, or the like. In other instances, the actuator 204 may be provided with power from a battery or other suitable power source. In a wired configuration, wires may be maintained such that connections cannot be reached and damaged through passenger use of the passenger seat 102. Although the accelerometer 202 has been described as being electrically coupled to the actuator 204, this is not intended as a limitation of the present disclosure. In some instances, the accelerometer 202 may be wirelessly coupled to the actuator 204, for providing the signal indicative of the emergency event. For example, the accelerometer 202 and the actuator 204 may wirelessly communicate by a short-range wireless communication network, such as a Wi-Fi, Li-Fi, Bluetooth, Zigbee, or Ultra-Wide Band (UWB) network. For example, the wireless communication may occur by wireless communication circuitry, such as a radio, transceiver, and other associated circuitry, that allow the accelerometer 202 and the actuator 204 to wirelessly communicate. Alternatively, the accelerometer 202 may be included in a common housing with the actuator 204.

The accelerometer 202 may generally be located in a number of locations within the aircraft. For example, the accelerometer 202 may be located on a frame portion (e.g., the leg 108, a seatback frame, etc.) of the passenger seat 102. It is further contemplated that the accelerometer 202 may be associated with multiple of the passenger seats 102, such as, but not limited to, a seating row of the aircraft including two or more of the passenger seats 102. The accelerometer 202 may generally include any sensor for detecting the acceleration. In some instances, the accelerometer 202 may be a component of an inertial measurement unit (IMU) which may include the accelerometer 202, a gyroscope, a magnetometer, and the like.

In some instances, the actuator 204 includes a potential energy storage device. The actuator 204, in a first example, may be a pyrotechnic actuator 206. The pyrotechnic actuator may include, among other components, an electrically ignited pyrotechnic charge. Small pyrotechnic actuators can typically exert significant force (10's or 100's of pounds) and achieve actuation speeds as low as several milliseconds. Although the actuator 204 has been described as including a pyrotechnic actuator, this is not intended as a limitation of the present disclosure. The actuator 204 may also include a linear solenoid actuator 208. The linear solenoid may require a high drive current to exert significant force in a short time period, but a linear solenoid can be used thousands of times without replacement. The actuator 204 may also include a spring-loaded actuator 210. However, the use of the pyrotechnic actuator may be advantageous given the high energy density, as compared to the linear solenoid or the spring-loaded actuator, such that the spring-loaded actuator may require additional footprint to achieve a sufficient spring force to generate the motive force. However, the pyrotechnic actuator may be limited to a one-time operation before replacement.

In embodiments, the passenger seat 102 may include a locking component 212. The locking component may retain the various actuated components described above (e.g., the shroud 116, the shroud 118, the pocket 120, the pocket 122, or the hinged surface 602) in a deployed position subsequent to the actuator 204 deploying the actuated component. The actuated component is then be prevented from freely returning to the initial condition by the locking component 212. The use of the locking component 212 may be advantageous given a possibility of the passenger's head impacting with the molding 110 or the tray table 112. Similarly, the locking component 212 may reduce or prevent unwanted deflection of the actuated component from the deployed position prior to impact with the passenger's head, which may otherwise result from the rapid actuation of the actuated component. The locking component 212 may include, but is not limited to, an over-center device. The over-center device may include a linkage which operates as a toggle action clamp or the like.

In embodiments, the actuator 204 may include a shear pin (not depicted) or other sacrificial part. The shear pin may be incorporated in the actuator 204 to prevent deployment under non-crash scenarios. The shear pin may be then sheared in response to the actuator 204 being engaged. Upon the shear pin becoming sheared, the actuator 204 may deploy one or more components of the passenger seat 102 to shield the latch mechanism.

Figure 3:
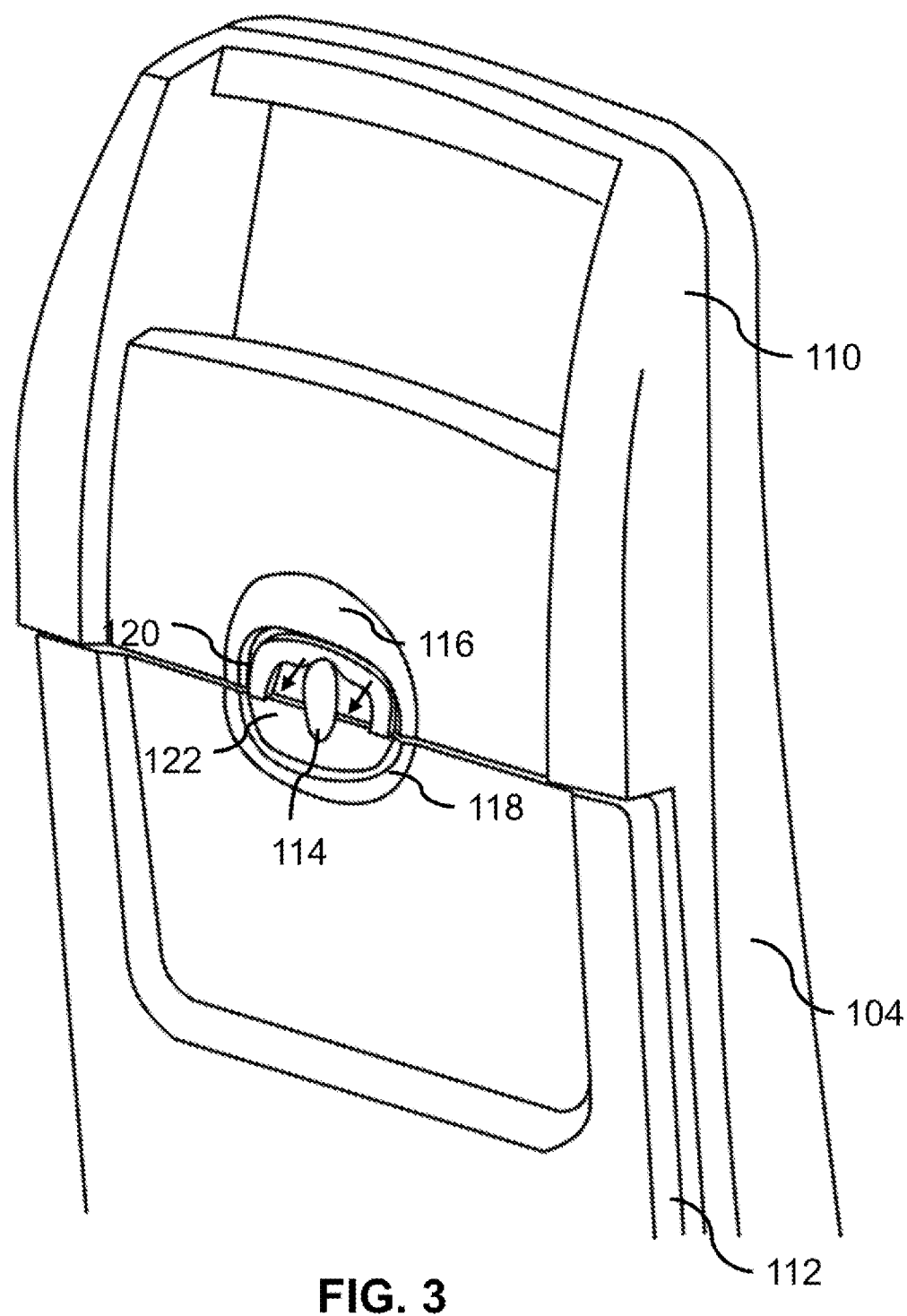
FIG. 3 depicts a rear perspective view of a passenger seat including a pocket in an extended position, in accordance with one or more embodiments of the present disclosure.

Referring now to FIG. 3, an exemplary embodiment of one or more components of the passenger seat 102 is described. In embodiments, the pocket 120 is actuatable by the actuator 204 to shield the latch mechanism 114. The actuator 204 may translate the pocket 120 relative to the shroud 116 in response to receiving the signal from the accelerometer 202. The translation of the pocket 120 relative to the shroud 116 may then cause the pocket 120 to provide at least partially filling in the pocket 120 or further to entirely fill in the pocket 120 (depending upon the depth and the length of actuation), thereby forming a flush surface together with the latch mechanism 114. By providing the flush surface, a surface area upon which the passenger's head may impact may be increased, thereby reducing the forces felt by the passenger. In this regard, the latch mechanism 114 may be shielded by the pocket 120. Furthermore, the pocket 120 may allow the latch mechanism 114 to unlock the tray table 112 prior to actuation. In some instances, the pocket 120 may be brace-shaped. By the brace-shape, the pocket 120 may conform to the curved surface of the shroud 116 and may also be translated relative to the latch mechanism 114 without interfering with the latch mechanism 114.

In embodiments, the pocket 120 may be translated such that the latch mechanism 114 is flush with the pocket 120. In this regard, a stroke of the actuator 204 may be selected based on a distance between an exterior surface of the latch mechanism 114 and an exterior surface the pocket 120. The exterior surfaces of the latch mechanism 114 and the pocket 120 may then be parallel such that the pocket 120 is flush with the latch mechanism 114. The configuration depicted may be advantageous for situations where a passenger's head is rotated downwards and would otherwise strike a top surface of the latch mechanism 114. The pocket 120 may thus be actively used to fill in a voided space where above the latch mechanism 114, thereby smooth out the surface as a result of impact being sensed.

Figure 4:
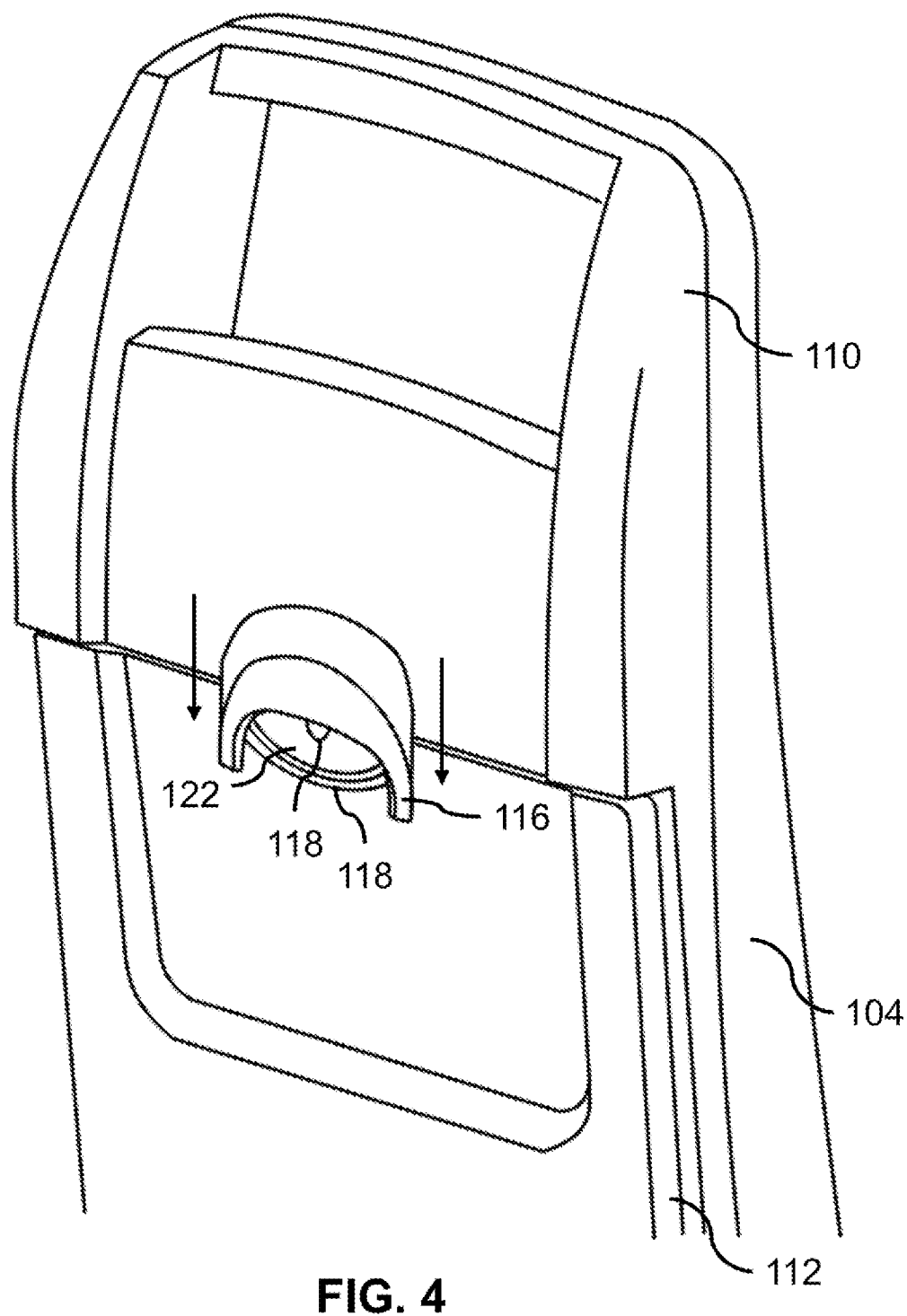
FIG. 4 depicts a rear perspective view of a passenger seat including a shroud in an extended position, in accordance with one or more embodiments of the present disclosure.

Referring now to FIG. 4, an exemplary embodiment of one or more components of the passenger seat 102 is described. Although the pocket 120 is described as being actuated to create the flush surface with the latch mechanism 114 thereby shielding the latch mechanism 114, this is not intended as a limitation of the present disclosure. In embodiments, the shroud 116 may be actuated to shield the latch mechanism 114. For example, the shroud 116 may be actuated in a downwards direction, thereby at least partially or entirely covering the latch mechanism 114. In some instances, the shroud 116 may extend sufficiently far downwards such that the shroud 116 may also lock the tray table 112 in the stowed position.

Figure 5A:
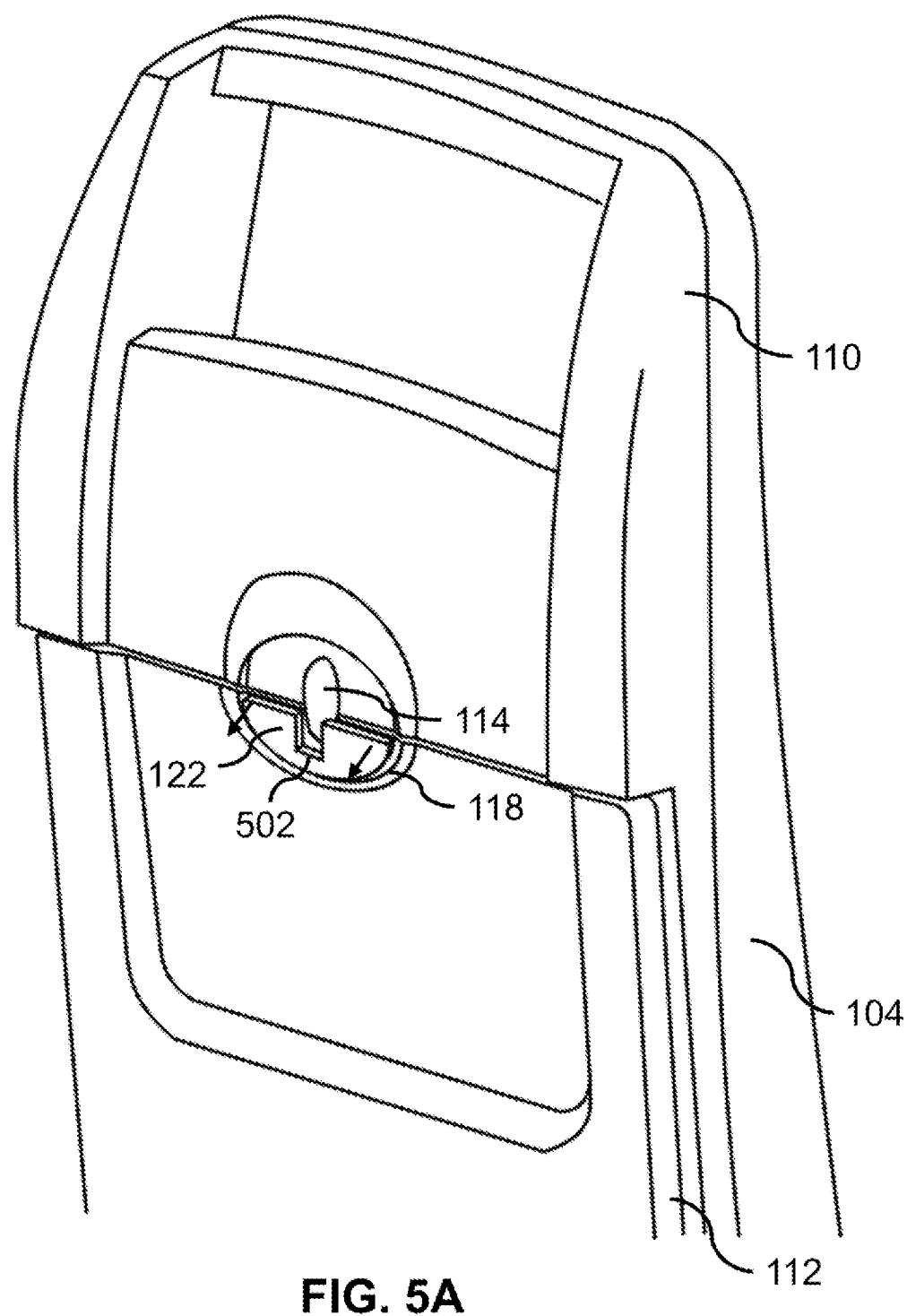
FIG. 5A depicts a rear perspective view of a passenger seat including a pocket in an extended position, in accordance with one or more embodiments of the present disclosure.
Figure 5B:
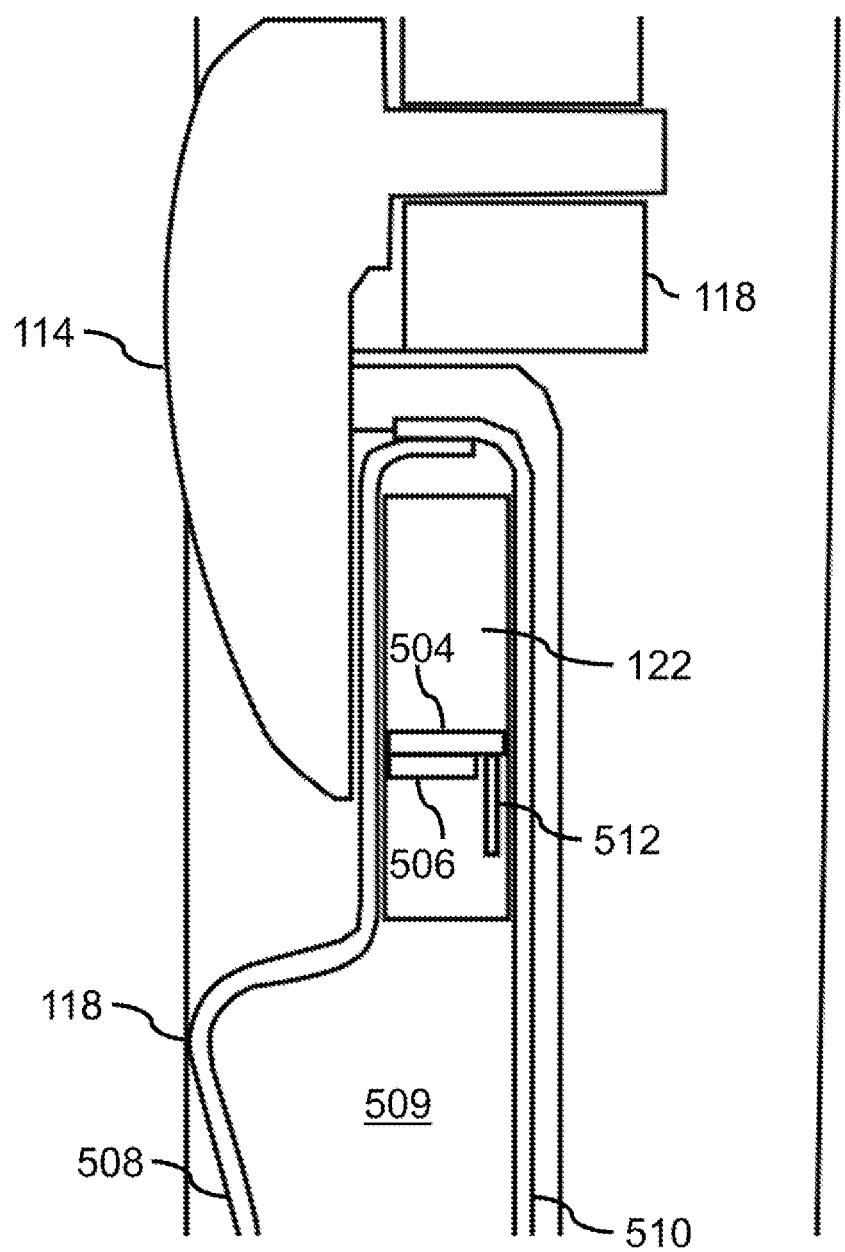
FIGS. 5B-5C depict a cross-section view of a passenger seat, in accordance with one or more embodiments of the present disclosure.
Figure 5C:
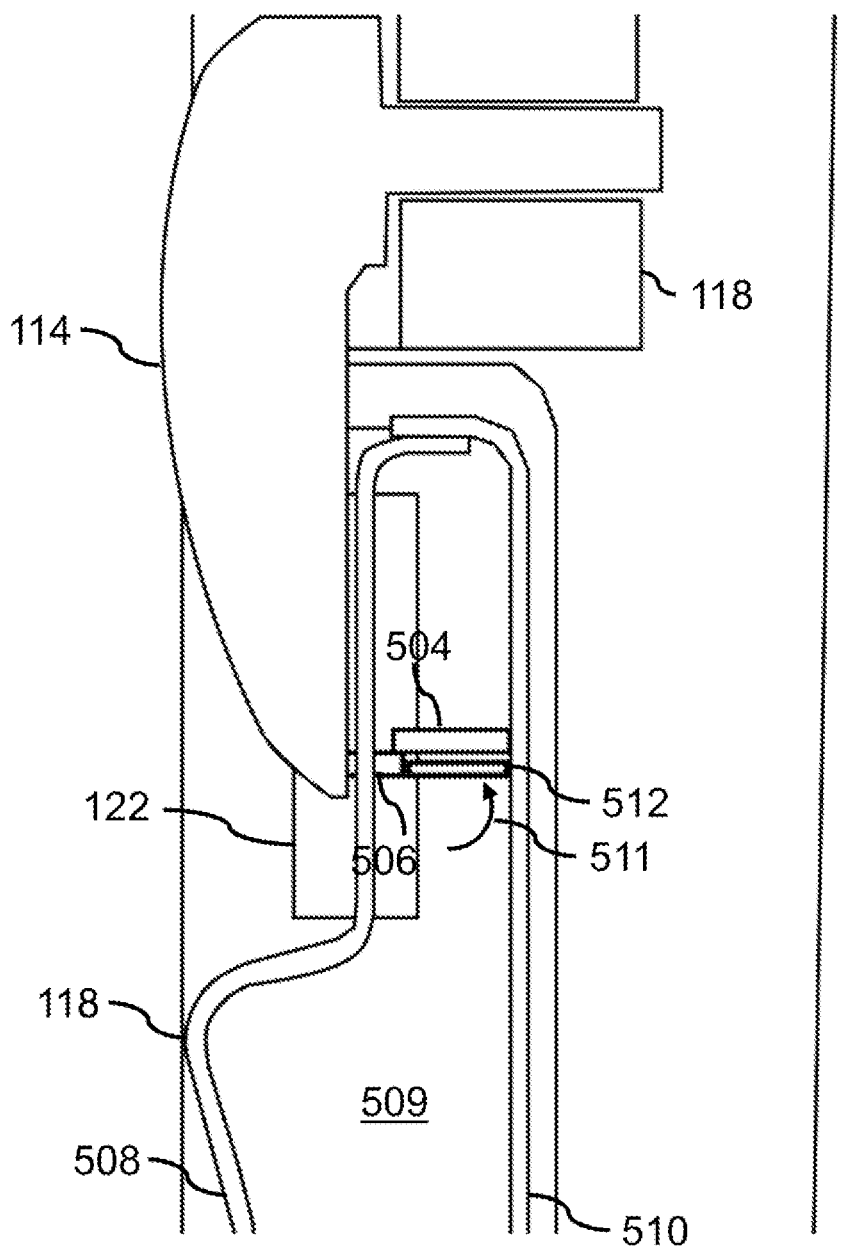

Referring now to FIGS. 5A-5C, an exemplary embodiment of one or more components of the passenger seat 102 is described. Although much of the present disclosure has described one or more components of the molding as translating, this is not intended as a limitation of the present disclosure. In embodiments, the active component used to shield the latch mechanism 114 may include one or more components of the tray table 112. For example, the actuator 204 may be located within a structure of the tray table 112. The actuator 204 may then be configured to translate one or more of the pocket 122 (as depicted) or the shroud 118. By translating the pocket 122, the pocket 122 may be at least partially or entirely filled in. Where the pocket 122 is entirely filled in, the pocket 122 and the latch mechanism 114 may form a flush surface. Advantageously, the flush surface may reduce a likelihood of the passenger's chin getting caught on the shroud 118 during a downward motion. Furthermore, the pocket 122 may allow the latch mechanism 114 to unlock the tray table 112 prior to actuation.

The pocket 122 may also include a vertical slot 502. The vertical slot 502 may be provided such that the pocket 122 does not interfere with the latch mechanism 114 as the pocket 122 is actuated. In this regard, the vertical slot 502 may be aligned with the latch mechanism 114, when the latch mechanism 114 is in the downwards position. As may be understood, one or more portions of the pocket 122 may be separable from the tray table 112. Furthermore, the tray table 112 may include an integral portion of the pocket 122 which may be used in combination with the latch mechanism 114 to retain the tray table 112 in the stowed position. Although the pocket 122 is depicted as being translated outwards from the tray table 112, this is not intended as a limitation of the present disclosure. In embodiments, the pocket 122 may slide up or slide from the sides of the shroud 118.

Referring now in particular to FIGS. 5B-5C, the tray table 112 may include a slide mechanism including a fixed member 504 and a slidable member 506. The slidable member 506 may be coupled between the pocket 122 and the fixed member 504 for translating the pocket 122. The fixed member 504 may be fixed in a cavity 509 of the tray table 112 defined by a first surface 508 and a second surface 510. The slide mechanism may also include a rotatable member 512. The rotatable member 512 may rotate causing the slidable member 506 to translate the pocket. For example, the rotatable member 512 may rotate 511 and hit a rear surface of the slidable member 506 thereby shooting the pocket 122 into a position in which the pocket 122 shields (e.g., where the pocket 122 is at least partially or entirely filled in) the latch mechanism 114. The rotatable member 512 may be spring loaded. Although the slidable member 506 is described as being translated by the rotatable member 512, this is not intended as a limitation of the present disclosure. The slidable member 506 may also include one or more gear teeth which form a rack, which may be engaged with a pinion gear disposed in the cavity 509. The pinion gear may then rotate and cause the slidable member 506 to translate the pocket 122 to shield the latch mechanism 114.

Figure 5D:
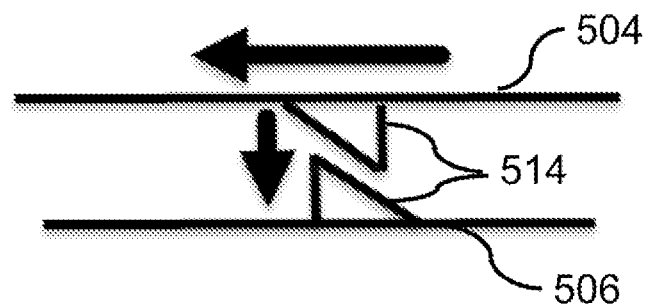
FIG. 5D depicts a side view of a locking feature, in accordance with one or more embodiments of the present disclosure.

Once the pocket 122 is in position, the pocket 122 may be locked in place. For example, the slide mechanism (e.g., one or more of the fixed member 504 and the slidable member 506) may include a lock. The lock may be provided to prevent the slidable member 506 from translating, so that the pocket 122 is not able to move back into cavity defined within the tray table 114. As depicted, in FIG. 5D the fixed member 504 and the slidable member 506 may each include teeth 514. The teeth 514 may be arranged to permit one directional motion of the slidable member 506 relative to the fixed member 504 (e.g., for extending the pocket 122). The arrangement of the teeth 514 may also caused a keying action once the slidable member 506 is translated, thereby preventing the pocket 122 from further translation. This may be beneficial in preventing the passenger's head from moving the pocket 122 upon impact. It is further contemplated that alternative locking features may be provided to lock the pocket 122, such as, but no limited to, a ratchet and pawl, and the like.

Although the slide mechanism is described in the context of translating the pocket 122, this is not intended as a limitation of the present disclosure. A similar slide mechanism may be provided for translating one or more of the shroud 116, the shroud 118, the pocket 120, the pocket 122, the hinged surface 602, or the like for shielding the latch mechanism 114.

Figure 6A:
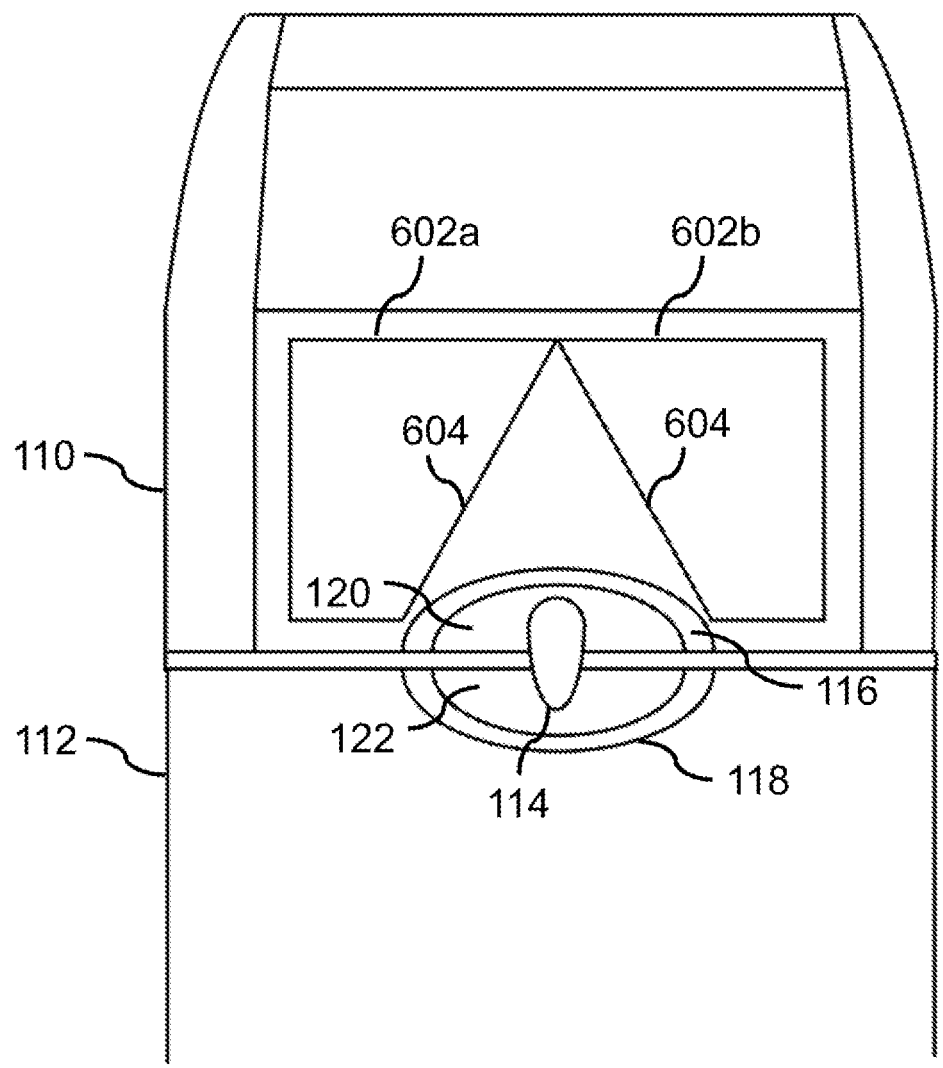
FIG. 6A-6B depict a rear perspective view of a passenger seat including hinged portions, in accordance with one or more embodiments of the present disclosure.
Figure 6B:
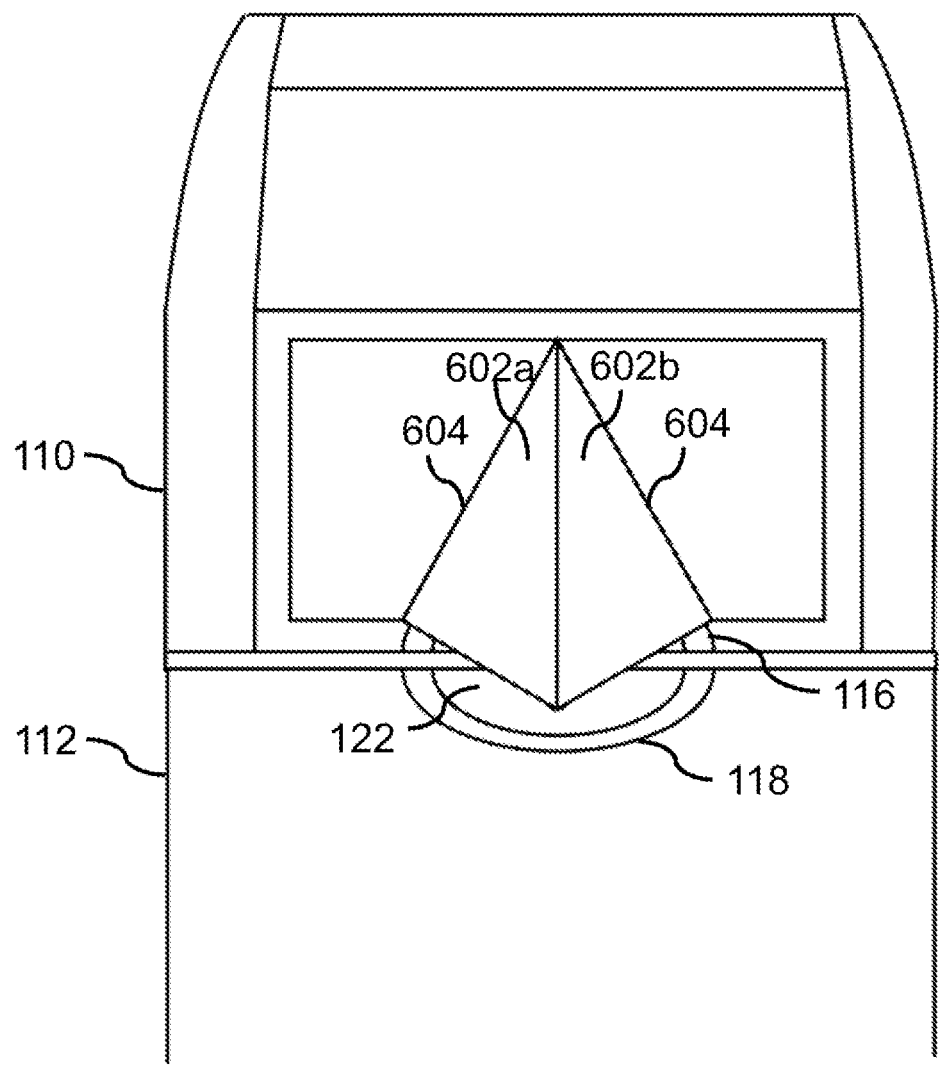

Referring now to FIG. 6A-6B, an exemplary embodiment of one or more components of the passenger seat 102 is described. The passenger seat 102 may include one or more hinged surfaces 602, such as a hinged surface 602*a* and a hinged surface 602*b*. The hinged surfaces 602 may be rotated about a hinge 604. The hinge 604 may be set at an angle relative to the tray table, such as, but not limited to, a 45-degree angle. By hinging, the hinged surfaces 602 may be rotated to a deployed state to at least partially or entirely cover the latch mechanism, thereby shielding the latch mechanism. The hinged surface 602 may further at least partially or entirely cover the shroud 116 and/or the shroud 118.

Figure 7:
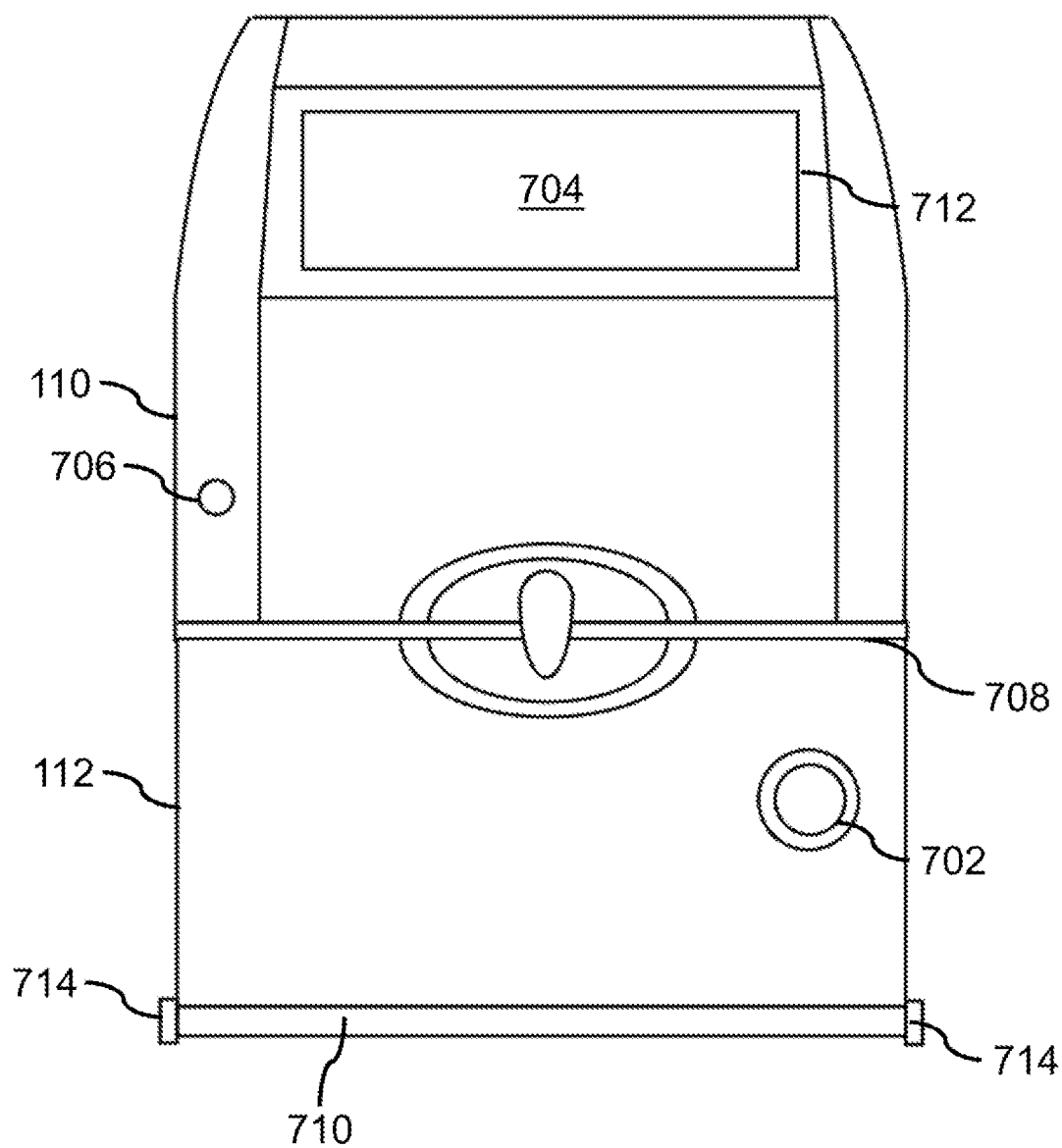
FIG. 7 depicts a rear perspective view of a passenger seat including one or more components which may be shielded in an emergency event, in accordance with one or more embodiments of the present disclosure.

Referring now to FIG. 7, although much of the present disclosure is directed to the use of an active component to shield the tray table latch, this is not intended as a limitation of the present disclosure. It is contemplated that the use of the active components may be advantageous in shielding other components of the seatback 104 which may cause undesirable neck flexion during impact. Various sections of the seatback may be actuated to accommodate an area likely to provide a problematic area upon impact. In this regard, any suitable surface connected to the rearward facing surface of the seatback may be actuated by the actuator 204. For example, the one or more portions of the tray table 110 or the molding 112 may be translated to smoothen out an irregular surface (e.g., a ridge, an impression, or a depression, etc.) associated with any number of components disposed on a rear surface of the passenger seat 102, such as, but not limited to, a cupholder 702, a video monitor 704, a coat hook 706, a top edge 708 of the tray table 112, a pivot bar 710, and the like built-in tray table or molding accessories.

The cupholder 702 may be disposed in one of the molding 110 or the tray table 112. As depicted, the cupholder 702 is disposed in the tray table 112 and may include an annular shaped depression by which the cupholder 702 is configured to hold a cup when the tray table 112 is deployed. The annular shaped depression of the cupholder 702 may be actuated inwardly or outwardly to reduce the neck injury criterion. Although not depicted, the cupholder 702 may also be a component of a cupholder assembly disposed within the molding 110. The cupholder assembly may deploy the cupholder for holding the cup without regard to the position of the tray table 112.

The video monitor 704 may be disposed within the molding 110. The video monitor 704 may be provided for display videos or other digital entertainment during flight. The video monitor 704 may include a bezel 712 surrounding the video monitor 704. The molding may be actuated to reduce a neck injury associated with striking the bezel 712.

The top edge 708 of the tray table 112 may experience a likelihood of crushing during impact. The top edge 708 of the tray table 112 may be translated outwardly to smoothen out the surface, even if the top edge 708 is crushed, thereby reducing a neck injury criterion associated with striking the tray table 112.

The coat hook 706 may be disposed on the molding 110 and include one or more features for retaining a coat. For example, the coat hook 706 may include a circular knob extending from the molding 110. The molding 110 may be translated outwardly to reduce profile of the coat hook 706, thereby reducing a neck injury criterion associated with striking the coat hook 706.

The pivot bar 710 of the tray table may include one or more pivot joints 714 by which the tray table 112 is pivotably coupled to one or more linkages (not depicted). The linkages may then be pivotably coupled to the seatback 104, by which the tray table 112 is configured to pivot relative to the seatback 104. The bottom edge of the tray table 112 may be translated outwardly, thereby reducing a neck injury criterion associated with striking the pivot bar 710.

Thus, one or more components of the tray table 112 or the molding 110 may be translated to reduce a likelihood of the neck catching on the irregular surface. Described are any devices that actively deploy during a 16 g impact event to smooth the back surface to reduce a neck injury associated with striking the back surface of the passenger seat 102. Optionally, the various devices may reduce inadvertent deployment of the tray table 112. Such surfaces may generally be translated to reduce or eliminate a gap, a ledge, or the like on the rearward surface of the seatback. For example, the gap may be eliminated by filling the in gap, thereby forming a flush surface by any number of the various examples described herein. It is further contemplated that the surfaces described herein may not be flush, but may still reduce the gap thereby reducing a likelihood for neck flexion with catching on the gap.

Referring generally again to FIGS. 1A-7, although example embodiments of the present disclosure are shown and described in an aircraft environment, the concepts of the present disclosure may be configured to operate in alternative and/or additional contexts, unless noted otherwise herein. Therefore, the above description should not be interpreted as a limitation on the disclosure but merely an illustration.

In embodiments, the passenger seat 102 may also include one or more airbags. The airbags may be provided for a similar purpose of reducing a likelihood of neck flexion. However, the various translating components described herein may be advantageous in maintaining the seatback and the tray table with a reduced weight, as compared to the use of the airbags.

It is further noted herein that, where the environment includes an aircraft environment, it is noted herein the embodiments of aircraft passenger seat apparatus may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A passenger seat comprising:
   a seatback including a rearward facing surface and one or more surfaces connected to the rearward facing surface;
   an accelerometer configured to generate a signal in response to detecting an acceleration indicative of an emergency event;
   a tray table configured to pivot relative to the seatback;
   a latch mechanism configured to rotate to a downward position for securing the tray table in a stowage position; and
   an actuator configured to translate the one or more surfaces connected to the rearward facing surface in response to the actuator receiving the signal from the accelerometer; wherein the actuator is configured to translate the one or more surfaces connected to the rearward facing surface to at least one of at least partially fill in a pocket in which the latch mechanism is disposed or at least partially cover the latch mechanism.

2. The passenger seat of claim 1, wherein the one or more surfaces connected to the rearward facing surface further restrain the tray table in the stowage position when translated.

3. The passenger seat of claim 1, further comprising a molding disposed on a rear surface of the seatback, wherein at least one of the molding or the tray table includes a shroud defining the pocket; wherein at least a portion of the latch mechanism is disposed in the pocket; wherein the actuator is configured to translate one or more portions of the tray table or the molding in response to the actuator receiving the signal from the accelerometer.

4. The passenger seat of claim 3, wherein the actuator is configured to translate the pocket relative to the shroud to at least partially fill in the pocket.

5. The passenger seat of claim 4, wherein the molding includes the shroud defining the pocket, wherein the translation of the pocket relative to the shroud causes the pocket to entirely fill in the pocket thereby forming a flush surface together with the latch mechanism.

6. The passenger seat of claim 3, wherein the actuator is configured to translate the shroud vertically downwards over the latch mechanism to at least partially cover the latch mechanism.

7. The passenger seat of claim 6, wherein the shroud is further configured to translate vertically downwards over the tray table for securing the tray table in the stowage position.

8. The passenger seat of claim 3, wherein the tray table includes the shroud defining the pocket, wherein the latch mechanism is configured to rotate within the pocket to secure the tray table.

9. The passenger seat of claim 8, wherein the actuator is configured to translate the pocket relative to the shroud to at least partially fill in the pocket.

10. The passenger seat of claim 9, wherein the pocket includes a vertical slot, wherein the vertical slot is aligned with the latch mechanism when the latch mechanism is in the downwards position.

11. The passenger seat of claim 9, wherein by translating the pocket, the pocket is entirely filled in; wherein the pocket and the latch mechanism form a flush surface where the pocket is entirely filled in.

12. The passenger seat of claim 1, wherein the one or more surfaces connected to the rearward facing surface includes a first hinged surface and a second hinged surface; wherein the actuator is configured to translate the first hinged surface and the second hinged surface; wherein by hinging, the first hinged surface and the second hinged surface are rotated to a deployed state to at least partially cover the latch mechanism.

13. A system comprising:
    a seatback;
    a tray table;
    a latch mechanism configured to rotate to a downward position for securing the tray table in a stowage position;
    a molding disposed on a rear surface of a seatback, the molding including a shroud defining a pocket, wherein at least a portion of the latch mechanism is disposed in the pocket; and
    an actuator configured to translate the pocket relative to the shroud in response to the actuator receiving a signal indicative of an emergency event, wherein the pocket and the latch mechanism each include an exterior surface which are flush when the pocket is translated.

* * * * *